United States Patent [19]

Leaf

[11] 4,128,355
[45] Dec. 5, 1978

[54] FLEXIBLE JOINT FOR SUSPENSION SYSTEMS AND THE LIKE

[75] Inventor: Ronn J. Leaf, Lexington, Ky.

[73] Assignee: Dura Corporation, Southfield, Mich.

[21] Appl. No.: 814,555

[22] Filed: Jul. 11, 1977

[51] Int. Cl.² .......................... F16C 35/00; F16F 1/38
[52] U.S. Cl. ..................................... 403/222; 308/26; 403/344
[58] Field of Search .................. 267/52; 403/220, 222, 403/225, 226, 228, 344; 285/353, 354; 248/230; 308/26, 238

[56] References Cited

U.S. PATENT DOCUMENTS

| | | | |
|---|---|---|---|
| 2,165,920 | 7/1939 | Burnip | 403/228 X |
| 2,174,320 | 9/1939 | Gonard | 267/52 |
| 2,585,489 | 2/1952 | Myers | 403/344 X |
| 3,817,550 | 6/1974 | Young | 308/26 X |

*Primary Examiner*—Price C. Faw, Jr.
*Assistant Examiner*—Conrad L. Berman
*Attorney, Agent, or Firm*—Hill, Gross, Simpson, Van Santen, Steadman, Chiara & Simpson

[57] ABSTRACT

A flexible joint for use in suspension systems and the like has a rigid cylindrical member, a resilient bushing encompassing the inner member, a split casing having opposed semi-cylindrical surfaces holding the bushing under compression toward the inner member and secured together in bushing-compressing relation, and rigid extrusion barriers preventing compression induced extrusion of the bushing into partings between the casing parts. Configuration of the extrusion barriers complements the compression loading of the resilient bushing by the surfaces of the casing parts.

11 Claims, 4 Drawing Figures

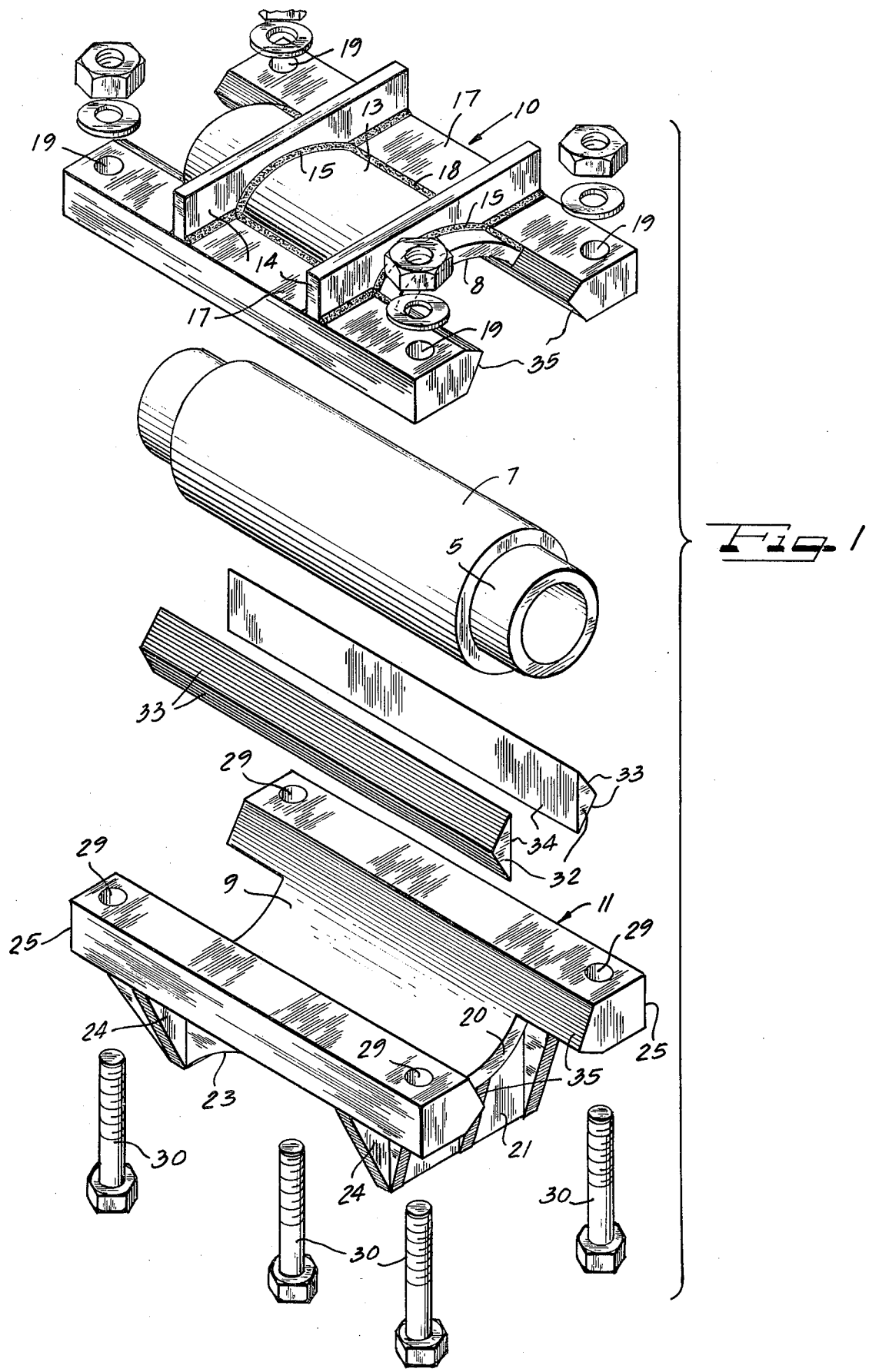

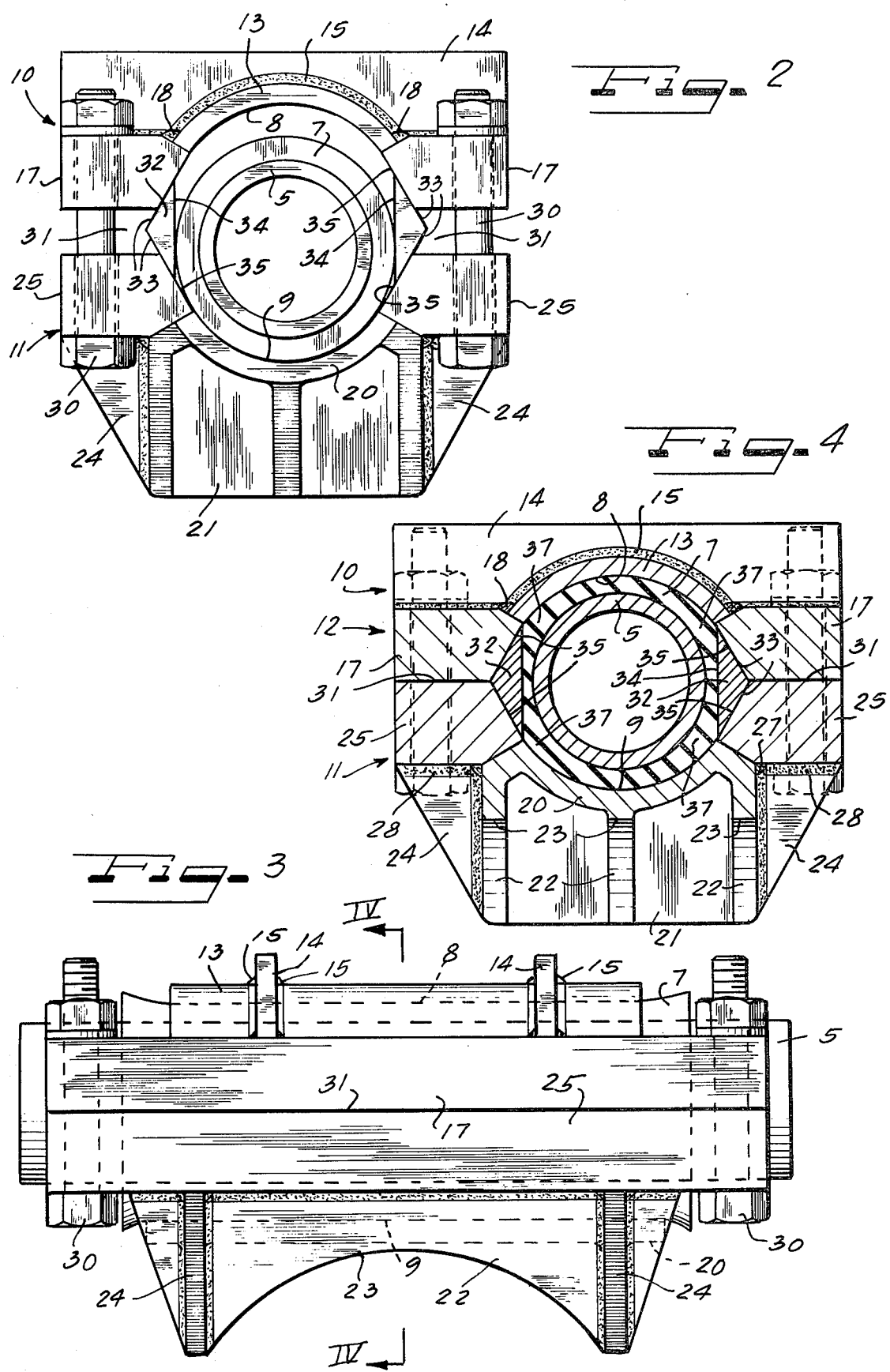

FLEXIBLE JOINT FOR SUSPENSION SYSTEMS AND THE LIKE

The present invention relates to improvements in flexible joints and is more particularly concerned with joints of the type especially useful for connecting relatively movable parts in suspension systems and the like.

In kinematic systems such as vehicle suspensions, wherein movable rods, levers, beams, and the like must be connected to other parts in a manner to permit at least limited pivoting or oscillation in various directions, it is necessary for the joints to be flexible in at least single but generally multi-directional functions. More particularly, the joints should be adequately flexible to permit lateral, radial, rotations, and other angular relative displacements of rigid structures connected together by the joints. Such joints should also possess damping capability against shock loading. The joints should also operate without lubrication.

Joints having the foregoing capability comprise resilient, customarily elastomeric bushings between rigid structures which are respectively attached to relatively movable parts connected together by the joints. In such elastic bushing joints, the bushings must be under sufficient radial compression to achieve a predetermined spring rate for the desired mode of operation, and to attain optimum fatigue life from the bushing material by virtue of the initial preload or prestress.

As heretofore constructed joints of this type, especially for use in vehicle suspensions, and in particular heavy duty suspensions such as in automotive trucks and trailers, where high effectiveness of the joint has been attained, a high cost construction has been deemed necessary. Where cost has been a factor so that minimum cost has been attained, effectiveness of the joints has been substantially lower with poor performance. Especially, where separability of the joint has been a consideration, extrusion of the resilient bushing into the partings between the outer casing components has been a problem and has hampered attainment of the full potential of the bushings in the joints.

An important object of the present invention is to provide a new and improved flexible joint construction which will overcome the disadvantages, drawbacks, inefficiencies, shortcomings and problems inherent in prior constructions.

Another object of the invention is to provide a new and improved flexible joint construction which can be produced at low cost and will nevertheless attain maximum effectiveness attaining superior performance properties attain efficient control of predetermined spring rate, will attain maximum fatigue resistance and endurance, is simple and easy to manufacture, is simple and easy to assembly, and which can be easily serviced in the field.

According to important features of the invention, there is provided a flexible joint for use in suspension and the like, comprising and rigid cylindrical inner member, a resilient bushing encompassing said inner member, a rigid casing comprising sections having opposed complementary semi-cylindrical compression surfaces holding said bushing under compression toward said inner member, means securing said casing sections together in bushing-compressing relation, said casing sections being substantially joined together at partings located intermediate said surfaces, and extrusion barriers engaged by and between said bushing and said sections and extending across partings and preventing extrusion of the compressed bushing into said partings. Configuration of the extrusion barriers complements the compression loading of the resilient bushing by the surfaces of the casing parts.

Other objects, features and advantages of the invention will be readily apparent from the following description of a representative embodiment thereof, taken in conjunction with the accompanying drawings although variations and modifications may be effected without departing from the spirit and scope of the novel concepts embodied in the disclosure, and in which:

FIG. 1 is an exploded isometric view of a flexible joint construction embodying features of the invention.

FIG. 2 is an end elevational view showing the parts of the joint construction partially assembled together.

FIG. 3 is a side elevational view of the joint structure fully assembled; and

FIG. 4 is a transverse sectional detail view taken substantially along the line IV—IV of FIG. 3.

In accordance with the invention a rigid cylindrical inner member 5 is encompassed by a resilient bushing 7 and in the assembly is held under compression toward the inner member 5 by opposed complementary semi-cylindrical surfaces 8 and 9 on sections 10 and 11 of a rigid casing 12. In a preferred construction for use of the joint in a heavy duty suspension such as especially adapted for automotive trucks and trailers, the cylindrical inner member 5 may be tubular, as shown, for receiving an elongate element such as a rod or shaft which is to be connected by the joint in relatively movable relation to other rigid structure of the vehicle to which the casing 12 may be attached.

Each of the casing sections 10 and 11 is externally dimensioned and configured to adapt it for the particular structure with which the casing is to be connected. For example, where the casing section 10 is to be located at the top of the joint assembly, it may comprise a semi-cylindrical part 13 which has on its inner face the concave, cylindrical surface 8. Spaced transverse reinforcing locater or gauging rib bars 14 extend across the respective opposite end portions of the part 13 and are secured fixedly thereto as by means of welding 15. In addition, the opposite end portions of the rib bars 14 project beyond the opposite sides of the part 13 and are secured as by means of extension of the weld 15 to attachment flange members 17 secured as by means of welding 18 to the adjacent sides of the part 13. At their opposite ends, the members 17 extend beyond the ends of the part 13 and are provided with bolt holes 19. If preferred, all of the parts 13, 14 and 17 may be formed in a single casting with suitably machined surfaces, because as will be apparent the parts are functionally integral when welded together as described.

To similar effect, the casing section or portion 11 comprises a semi-cylindrical part 20 providing the surface 9. In this instance, the part 20 is constructed as a casting equipped with a depending reinforcing flange or rib grid structure including transverse reinforcing flanges 20 in spaced adjacency to the opposite ends of the parts 20 and longitudinally extending spaced integral flanges 22 respectively along the opposite longitudinal sides and along the center of the part 20. Between the end flanges 21, the flanges 22 are desirably concavely recessed to define a saddle 23 adapted to engage with a suspension part with which the joint assembly is to be assembled for use. In addition, bracing pieces 24 may either be cast integrally with the outer of the flanges 22 but, as shown, may comprise separately formed pieces which are welded to the outer sides of the outer flanges 22 and serve to bracingly reinforce and assist in attachment to the part 20 of attachment flange bars 25 complementary to the attachment flange bars 17 and secured fixedly as by means of welding 27 to the part 20 and by means of welding 28 to the brace pieces 24. Bolt holes 29 in the end portions of the flange bars 25 match the bolt holes 19 of the flange bars 17. Thereby the shanks of bolts 30 are adapted to extend through the aligned bolt holes 19 and 29 for securing the casing sections 10 and 11 together as shown in FIGS. 2–4.

Extrusion of the bushing 7 into partings 31 at which the casing section 10 and 11 are joined together intermediate the compression surfaces 8 and 9, is prevented by extrusion barriers barrier elements which are desirably in the form of bars 32 of substantially wedge-shaped cross section. In assembly, the barriers bars 32 are engaged by and between the bushing 7 and the sections 10 and 11 and extend across the partings 31. In a preferred construction, the barrier bars 32 are constructed and arranged to serve the dual functions of barrier and bushing compressing means cooperative with the compression surfaces 8 and 9 to compress and control the volumetric displacement of the bushing 7 to a desired quantitative limit and initial preload or prestress to achieve optimum fatigue life from the bushing material. To this end, each of the barrier bars 32 is of rigid structure and is preferably of isosceles triangular cross sectional shape having two substantially equal divergently related outer surfaces 33 and a relatively broad flat inner face 34. Cooperatively related to the bar surfaces 33 are complementary camming surfaces 35 along the inner sides of the side flange bars 17 and 25 and which at each side of the assembly diverge from the parting 31 and merge with the adjacent sides of the compression surfaces 8 and 9, as best seen in FIGS. 2 and 4.

In effecting assembly of the point structure, the bushing 7 mounted on the cylindrical inner member 5 may be placed on one of the compression surfaces, herein shown as the compression surface 9 of the casing section 11. The barrier bars may then be assembled as shown with the cam surfaces 35 of the flange bars 25 and to rest against the bushing 7. The remaining casing section 10 may then be assembled so that the camming surfaces 35 of the flange bars 17 rest against the confronting barrier bar surfaces 33. The barrier bars 32 are therefore in extrusion preventing barrier relationship across the partings 31 and will remain in such barrier relationship. As the bolts 30 are tightened by means of suitable wrenching equipment, the camming surfaces 35 acting on the wedge surfaces 33 of the bars 32 cam the bars 32 inwardly and the bar faces 34 compress the bushing 7 toward the inner member 5. Then, as the compression surface 8 engages with the bushing 7 it cooperates with the compression surface 9 to place the bushing under compression toward the inner member 5. Bushing compressing approach of the bars 32 and the compression surfaces 8 and 9 toward the inner member 5 is lifted by interfacing of the opposing parting faces of the attachment flanges 17 and 25 in the partings 31 (FIGS. 3 and 4). Such interfacing limitation on the compression exerted by the bars 32 is desirable to avoid overstressing the resilient bushing 7 as might otherwise result because of the rigid, unyielding structure of the bars relative to the bushing 7, as is well-visualized on comparison of FIGS. 2 and 4, where it will be seen that the cross section of the bars 32 remains unchanged, even in the fully clamped condition of the assembly, where the bars 32 have placed the bushing 7 under maximum compression to the extent permitted by the interfacing flanges 17 and 25.

It will be understood, of course, that the volume of elastomer in the bushing 7 will be predetermined to attain the desired end results under full compression loading by the bars 32 and the compression surfaces 8 and 9. Where, as shown, the bushing 7 is preformed to cylindrical shape about the cylindrical rigid inner member 5, full compression loading may be into a symmetrically out of round configuration as best visualized in FIG. 4. To this end, the barrier bar surfaces 34 may press flatwise against the bushing 7 and displace material of the bushing in opposite directions along the faces 34 into respective major volume zones 37 adjacent to the opposite longitudinal edges of the faces 34 and the adjacent side edges of the compression surfaces 8 and 9. Likewise, the compression surfaces 8 and 9 may, as shown, be on a differential radius of curvature relative to the outer perimeter of the inner member 5 effecting a maximum compression of the surfaces 8 and 9 toward the member 5 at the center of the compression surfaces and providing expansion room adjacent to the opposite sides of the surfaces 8 and 9 to accommodate the increased volume zones 37 for the compressed bushing. This effects a desirable distribution of the compressed bushing material for at least certain suspension system installations.

It will be appreciated that the barrier bars greatly facilitate assembly of the joint structure by permitting the two sections of the split casing 12 to be drawn together into final assembly position without interference from the resilient bushing 7 at the partings 31. In addition, the barrier bars 32 provide efficient means in the joint assembly for attaining the desired preload or prestress and spring rate in the compressed resilient bushing. By virtue of the separable construction of the assembly and the provision of the advantageous extrusion barriers 32, the joint assembly can be easily field serviced for replacement of the bushing 37 if desirable or necessary.

It will be understood that variations and modifications may be effected without departing from the spirit and scope of the novel concepts of this invention.

I claim as my invention:

1. A flexible joint for use in suspension systems and the like, comprising:
   a rigid cylindrical inner member;
   a resilient bushing encompassing said inner member;
   a rigid casing comprising sections having opposed complementary semi-cylindrical compression surfaces holding said bushing under compression toward said inner member;
   means securing said casing sections together in bushing compressing relation;
   said casing sections being substantially joined together at partings located intermediate said surfaces;
   rigid combination compression applying and barrier elements engaged by and between said bushing and said sections and extending across said partings and preventing extrusion of the compressed bushing into said partings;
   said elements having compression surfaces for engaging and squeezing and displacing material of the resilient bushing, so that a predetermined spring rate prestressing of the bushing is effected whereby to improve the fatigue resistance and endurance of the bushing;

and means on said elements and on said casing sections cooperating for effecting thrusting of said elements into the bushing squeezing and bushing material displacing relation against the areas of the bushing engaged by said elements.

2. A flexible joint according to claim 1, wherein said compression surfaces and said inner member are of differential radius whereby to effect out of round compression of said resilient bushing under compression.

3. A flexible joint according to claim 1, wherein said securing means include attachment flanges in said casing sections at opposite sides of said partings, and bolts securing said flanges together.

4. a flexible joint according to claim 3, wherein said attachment flanges have divergently related camming surfaces along their inner sides, and said elements have wedge surfaces engaged by said camming surfaces.

5. A flexible joint according to claim 2, herein said elements are of isosceles triangular cross sectional shape and have respective faces providing said compression surfaces engaging the resilient bushing in compressing relation complementary to said compression surfaces.

6. A flexible joint according to claim 1 wherein said casing sections have camming surfaces facing toward said resilient bushing at said partings and said elements comprise rigid bars having wedge surfaces engaging said camming surfaces and cooperating with said camming surfaces to thrust the bars compressively against the bushing.

7. A flexible joint according to claim 4, wherein said, bars and said compression surfaces cooperate to provide zones of greater volume for the compressed resilient bushing between areas of maximum compression of the bushing between said compression surfaces and said inner member and between said bars and said inner member.

8. A flexible joint according to claim 7, wherein said bars have substantially flat faces in compressing engagement with said resilient bushing.

9. A flexible joint according to claim 1, wherein said elements comprise bars having wedging surfaces, and said casing sections have camming surfaces engaging said wedging surfaces at opposite sides of said partings.

10. A flexible joint according to claim 9, wherein said elements have bushing displacing faces engaging the bushing under compression.

11. In a jont of the type having rigid inner cylindrical and rigid semi-cylindrical outer part clamping an elastomeric intermdiate bushing member susceptible to compression extrusion between the parting line of the outer parts, the improvement comprising:

rigid elements serving as extrusion barriers interposed between the semi-cylindrical parts and lying along the parting lines to prevent extrusion of the bushing member thereinto;

and said elements also acting to squeeze the areas of the bushing member engaged by the elements against said inner cylindrical member, so that displacement of material of the bushing is effected and a predetermined spring rate is attained in the bushing member.

* * * * *